US008015218B2

(12) United States Patent
Thienot et al.

(10) Patent No.: US 8,015,218 B2
(45) Date of Patent: Sep. 6, 2011

(54) METHOD FOR COMPRESSING/DECOMPRESSING STRUCTURE DOCUMENTS

(75) Inventors: Cedric Thienot, Paris (FR); Claude Seyrat, Paris (FR)

(73) Assignee: Expway, Reims (FR)

( * ) Notice: Subject to any disclaimer, the term of this patent is extended or adjusted under 35 U.S.C. 154(b) by 1186 days.

(21) Appl. No.: 10/363,330

(22) PCT Filed: Aug. 31, 2001

(86) PCT No.: PCT/FR01/02719
§ 371 (c)(1),
(2), (4) Date: Aug. 4, 2003

(87) PCT Pub. No.: WO02/21848
PCT Pub. Date: Mar. 14, 2002

(65) Prior Publication Data
US 2004/0013307 A1    Jan. 22, 2004

(30) Foreign Application Priority Data
Sep. 6, 2000 (FR) ........................ 00 11356

(51) Int. Cl.
*G06F 7/00* (2006.01)
*G06F 17/30* (2006.01)
(52) U.S. Cl. ........................ 707/811; 707/809
(58) Field of Classification Search ............... None
See application file for complete search history.

(56) References Cited

U.S. PATENT DOCUMENTS

| 6,363,381 B1* | 3/2002 | Lee et al. ................. 707/6 |
| 6,553,141 B1* | 4/2003 | Huffman ................. 382/232 |
| 6,642,860 B2* | 11/2003 | Meulenbroeks ............ 341/51 |
| 6,667,700 B1* | 12/2003 | McCanne et al. ........... 341/51 |
| 6,850,948 B1* | 2/2005 | Krasinski .................. 1/1 |
| 6,883,137 B1* | 4/2005 | Girardot et al. ............ 715/513 |
| 7,013,425 B2* | 3/2006 | Kataoka ................. 715/242 |
| 7,043,686 B1* | 5/2006 | Maruyama et al. .......... 715/513 |
| 7,246,177 B2* | 7/2007 | Anton et al. ............... 709/247 |
| 7,373,591 B2* | 5/2008 | Mory et al. ............... 715/205 |
| 7,509,574 B2* | 3/2009 | Kamiya ................. 715/237 |
| 2001/0033236 A1* | 10/2001 | Iori et al. ................. 341/51 |
| 2002/0065822 A1* | 5/2002 | Itani .................... 707/7 |
| 2003/0028673 A1* | 2/2003 | Lin et al. ................. 709/247 |
| 2004/0054692 A1* | 3/2004 | Seyrat et al. ............. 707/104.1 |

* cited by examiner

*Primary Examiner* — Rehana Perveen
*Assistant Examiner* — Raheem Hoffler
(74) *Attorney, Agent, or Firm* — Bachman & Lapointe, P.C.

(57) ABSTRACT

The invention concerns a method for compressing and decompressing a structured document, associated with at least a tree diagram structure defining a document structure and comprising nested structure elements, associated with a type of information, and representing sets of data, the method comprising steps which consists in: performing a syntactic analysis of the structure diagram and standardizing it so as to obtain a single predefined sequence of the elements of the diagram; compiling the standardized diagram to obtain finite automata, each automaton comprising states interconnected by transitions respectively representing the elements of the structure; and compressing the document, and executing at least a compression algorithm associated with a type of information, when a set of data having the type of information is encountered in the document.

12 Claims, 4 Drawing Sheets

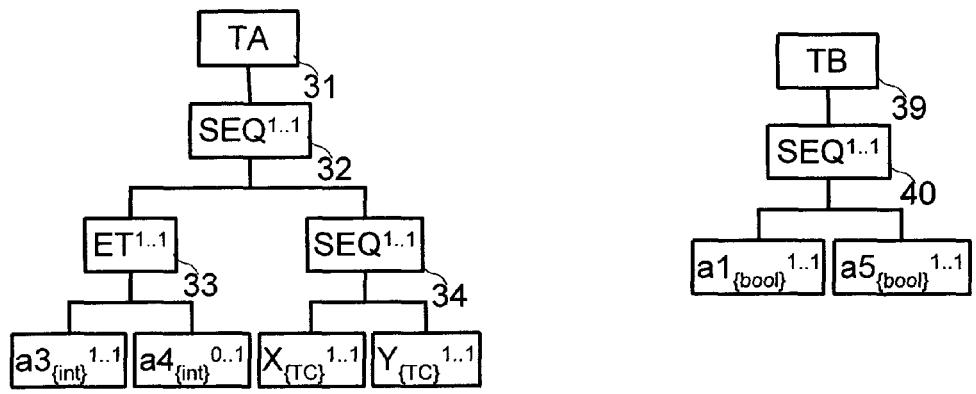
Fig. 2a
Fig. 2b
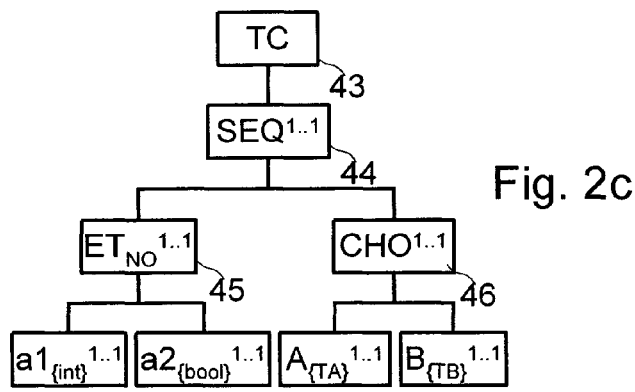
Fig. 2c
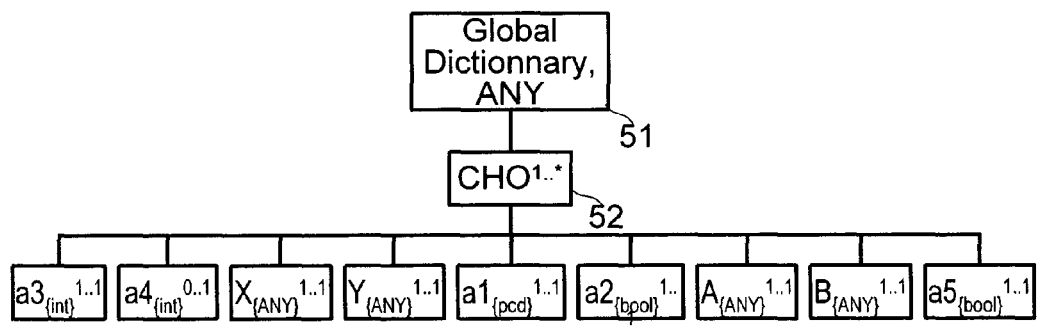
Fig. 3

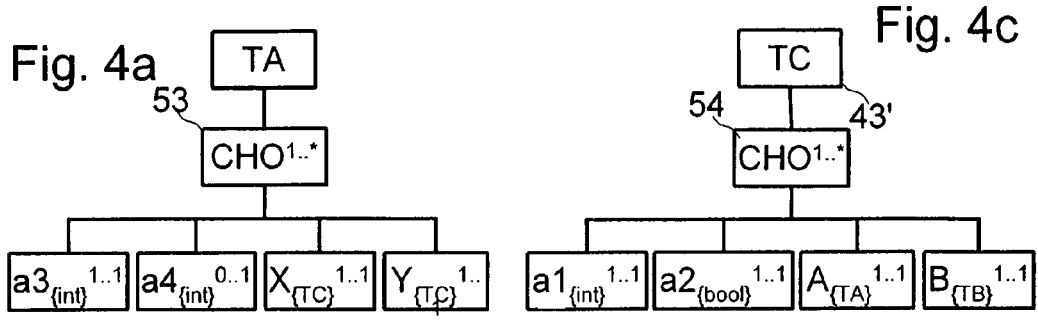
Fig. 4a
Fig. 4c
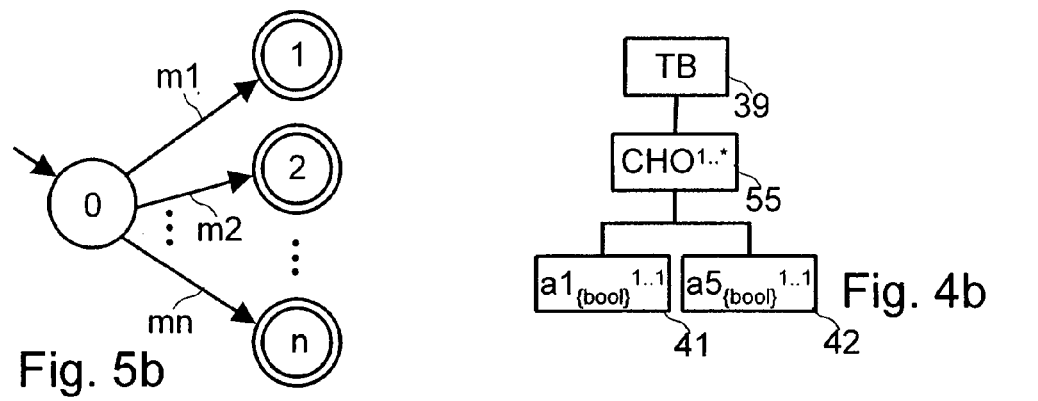
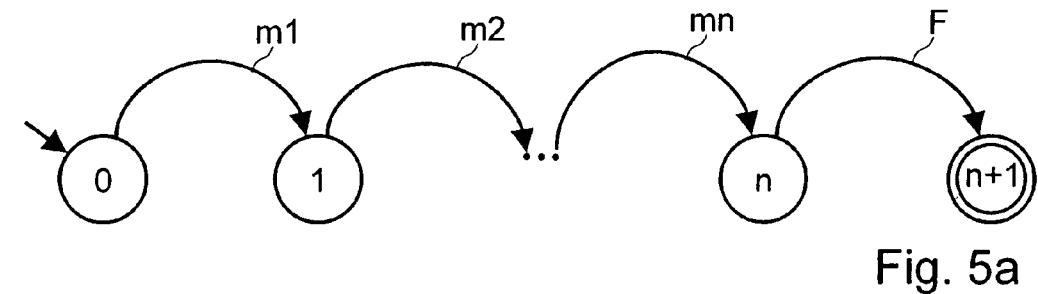
Fig. 5b
Fig. 4b
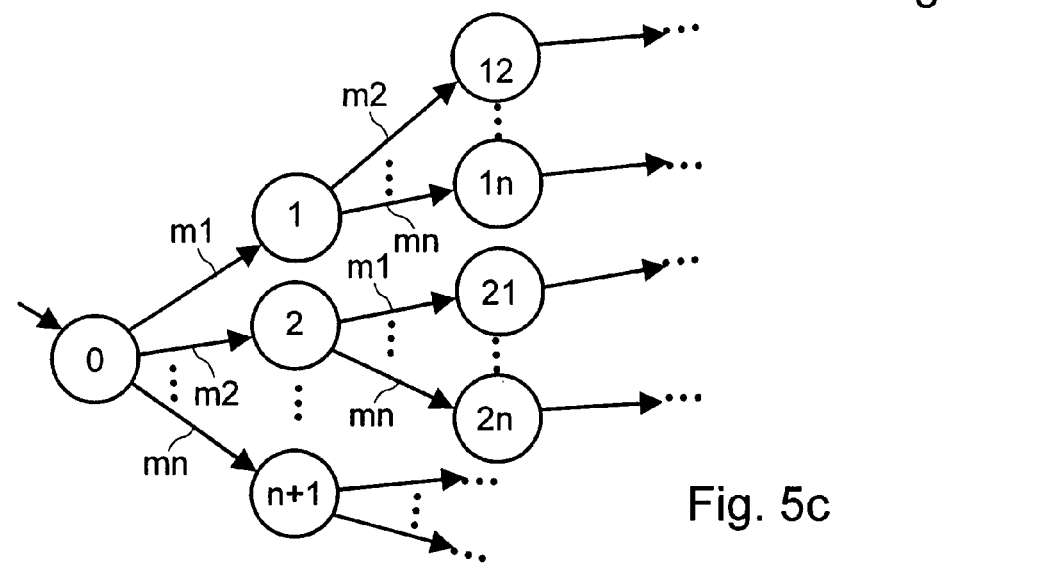
Fig. 5a
Fig. 5c

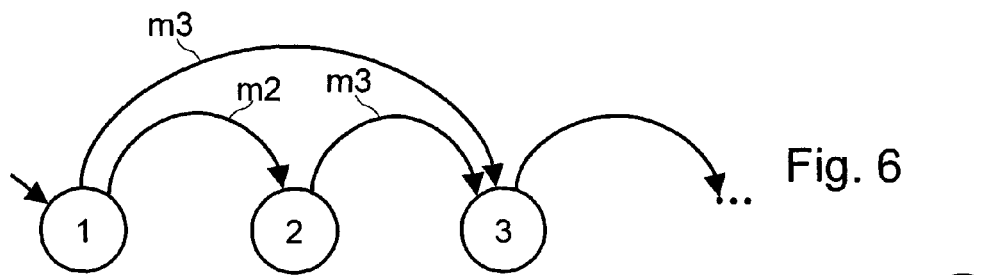
Fig. 6
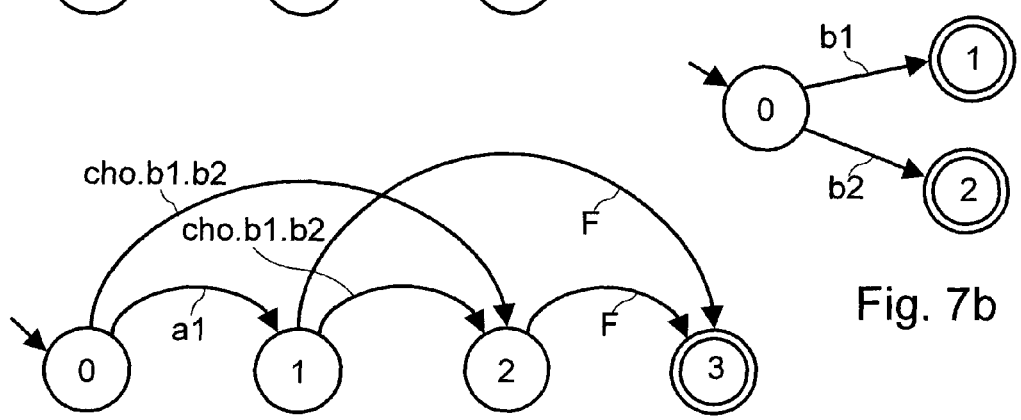
Fig. 7b
Fig. 7a
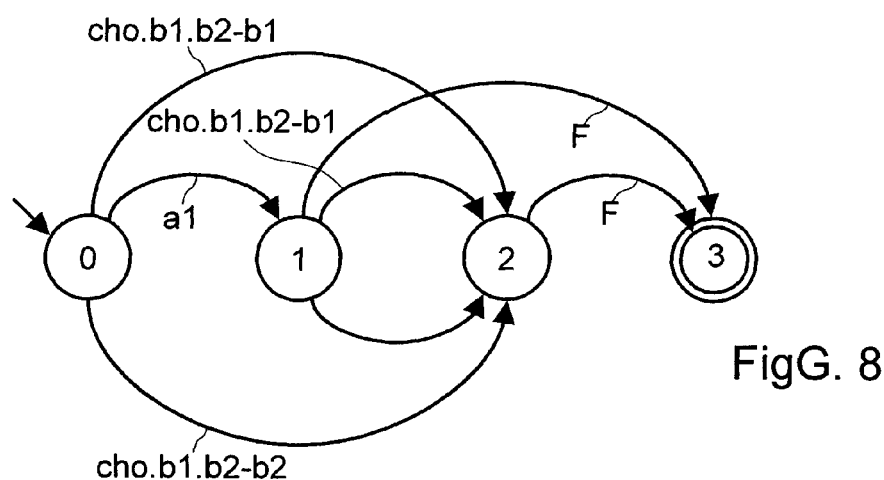
FigG. 8

METHOD FOR COMPRESSING/DECOMPRESSING STRUCTURE DOCUMENTS

BACKGROUND OF THE INVENTION

The present invention relates to a method for compressing/decompressing structured documents.

It applies particularly, but not exclusively, to the transmission of documents such as images or image sequences, video or sound data, via digital data transmission networks, and to the storage of such documents.

There are currently in existence a number of digital document compression algorithms. Some compression algorithms are designed to process the document's binary data directly, without taking account of the data type. These algorithms have the advantage of being able to process any document, but are ineffective (low compression rate) in processing bulky documents, which are generally of the sound or image type.

Furthermore other compression algorithms are known which are more efficient, but specially adapted to one data type, for example image or sound, with the result that they cannot be used or are ineffective if they are applied to documents which do not exclusively contain data for which they are designed.

Increasingly however, the documents being used and circulating on data transmission networks contain several information types integrated in one structure.

A structured document is a collection of data sets each associated with a type, and arranged together according to mainly hierarchical relationships. These documents employ a structuring language such as SGML, HTML, XML, making it possible particularly to distinguish the different data sets composing the document. In contrast, in a so-called linear document, the document's content information is mixed with the presentation and typing information.

A structured document thus includes locators or markers separating the different data sets of the document. In the case of SGML, XML or HTML formats, these locators known as "tags" are of the form "<XXXX> and "</XXXX>", the first marker indicating the start of the data set "XXXX" and the second the end of this set. A data set may be composed of several lower level data sets. In this way, a structured document has a hierarchical or tree structure schema, each node representing a data set and being connected to a higher hierarchical level node representing a data set which contains the lower level data sets. The nodes located at the end of a branch of this tree structure represent data sets containing data of a predefined type, which cannot be broken down into data subsets.

A structured document is generally associated with what is called a structure schema setting out in rule form the structure and type of information of each data set of the document. A schema is constituted by nested groups of data set structures, these groups being for example ordered sequences, alternative element groups or necessary element groups, sequenced or non-sequenced.

A structured document is thus associated with a structure schema and contains separation markers represented in the form of textual or binary data, these markers delimiting data sets which are themselves able to contain other data sets delimited by markers. The result is that a document structured in this way is able to include not only textual data, but also any other type of information (for example sound data, images, etc.). Consequently the specific compression algorithms of one particular type of data are ineffective and ill adapted in respect of processing this type of document.

SUMMARY OF THE INVENTION

The purpose of the present invention is to remove these drawbacks. To this end, it proposes a method for compressing and decompressing a structured document associated with at least one tree structure schema defining a structure of the document and including nested structure elements representing data sets, the structure elements being distributed in three categories, namely structured root elements broken down into structured or unstructured groups of elements and base elements corresponding to the lowest level elements in the structure, each base element and root element being associated with an information type.

According to the invention, at least one information type of the base elements is first associated with an adapted compression algorithm, the method including the following steps:

performing a syntactic analysis of the document's structure schema and normalizing it so as to obtain a single predefined sequence of the structure elements of the schema, compiling the normalized structure schema to obtain one finite automaton per root element, each automaton including states interconnected by transitions respectively representing the structure elements, and compressing the structured document including executing the finite automata on the document, and executing the compression algorithm when a data set having an information type associated with said algorithm is encountered in the document to be compressed.

By compiling the structure schema, the structure of the document is represented in a very compact way, and given that each data set corresponding to a base structure element is associated with an information type, it may be processed by the compression algorithm that is best adapted to its type. In this way, if the document contains for example textual data, images, sound data, this data is perfectly located in the structured document, and associated with a low level structure element and a type. When the automata are executed, they will detect the presence of data sets having a base type associated with a compression algorithm and invoke successively the algorithms corresponding to this data so as to obtain corresponding binary information sequences which are inserted as they arise into the binary document resulting from the compression.

Furthermore, in the case of a data transmission, if the documents transmitted always have the same structure schema, it is not necessary to transmit this at each document transmission, giving an additional gain in terms of the compression rate obtained by using the method according to the invention. It is even pointless to transmit it when the schema is previously known to the document's addressee. For example if it is an HTML document, there is never a need, even the first time, to encode the document schema.

By finite automaton must be understood a set of states, each state being associated with a set of input events and a transition function which determines for each input event the set of active states of the automaton. Given this definition, a number of representations may be imagined, involving code conversion tables for example, on the basis of one table per state indicating, for each input event, the table corresponding to the next state, or again correspondence tables, on the basis of one table per automaton having as many lines and columns as there are states in the automaton, with each box of the table containing the description of the transition between the two corresponding states.

When decompressing, the structure schema is processed in the same way so as to determine the automata used for compression and to analyze the content of the compressed document for the purpose of reconstituting a document in the original format having a structure which is at least equivalent, if not identical, with decompression algorithms corresponding to the compression algorithms used during compression being executed to restore the original data sets from the binary information sequences located in the compressed document.

Where the structure schema is to be transmitted with the document, the method according to the invention includes advantageously a step of transmitting the structure schema which may be the original, or that obtained after transformation and normalization or again that obtained after compilation.

According to one particularity of the invention, each data set is located in the compressed document so as to enable direct access to a particular information element, without it being necessary to decompress the whole document, or the data sets preceding the set to be decompressed.

According to another particularity of the invention, each structure schema element is furthermore associated with a set of possible numbers of occurrences, indicating the number of times that a data set having this structure element can appear in the data set of immediately higher level to which it belongs.

The process according to the invention may include a step of optimizing the document's structure schema consisting in reducing the number of hierarchical levels of groups of structure elements. This optimization makes it possible to simplify the structure schema but renders the compression process less efficient.

BRIEF DESCRIPTION OF THE DRAWINGS

One preferred mode of implementing the method according to the invention will be described below, in a non-restrictive way, with reference to the appended drawings in which:

FIGS. 2a, 2b and 2c show graphically a structure schema in form of a tree;

FIG. 3 shows a structure schema obtained by applying a reduction method according to the invention to the structure schema shown in FIG. 2;

FIGS. 4a, 4b and 4c show a structure schema obtained by applying another reduction method according to the invention to the structure schema shown in FIG. 2;

FIGS. 5a to 5c show respectively three finite automata obtained and used by the method according to the invention;

FIG. 6 shows another automaton illustrating an optimization method used by the method according to the invention;

FIGS. 7a and 7b show two automata obtained by using the process according to the invention from a particular structure schema; and FIG. 8 shows the application of a reduction method to the automata shown in FIGS. 7a and 7b.

FIG. 1 shows the links between the different steps of the method according to the invention.

Figure 1:
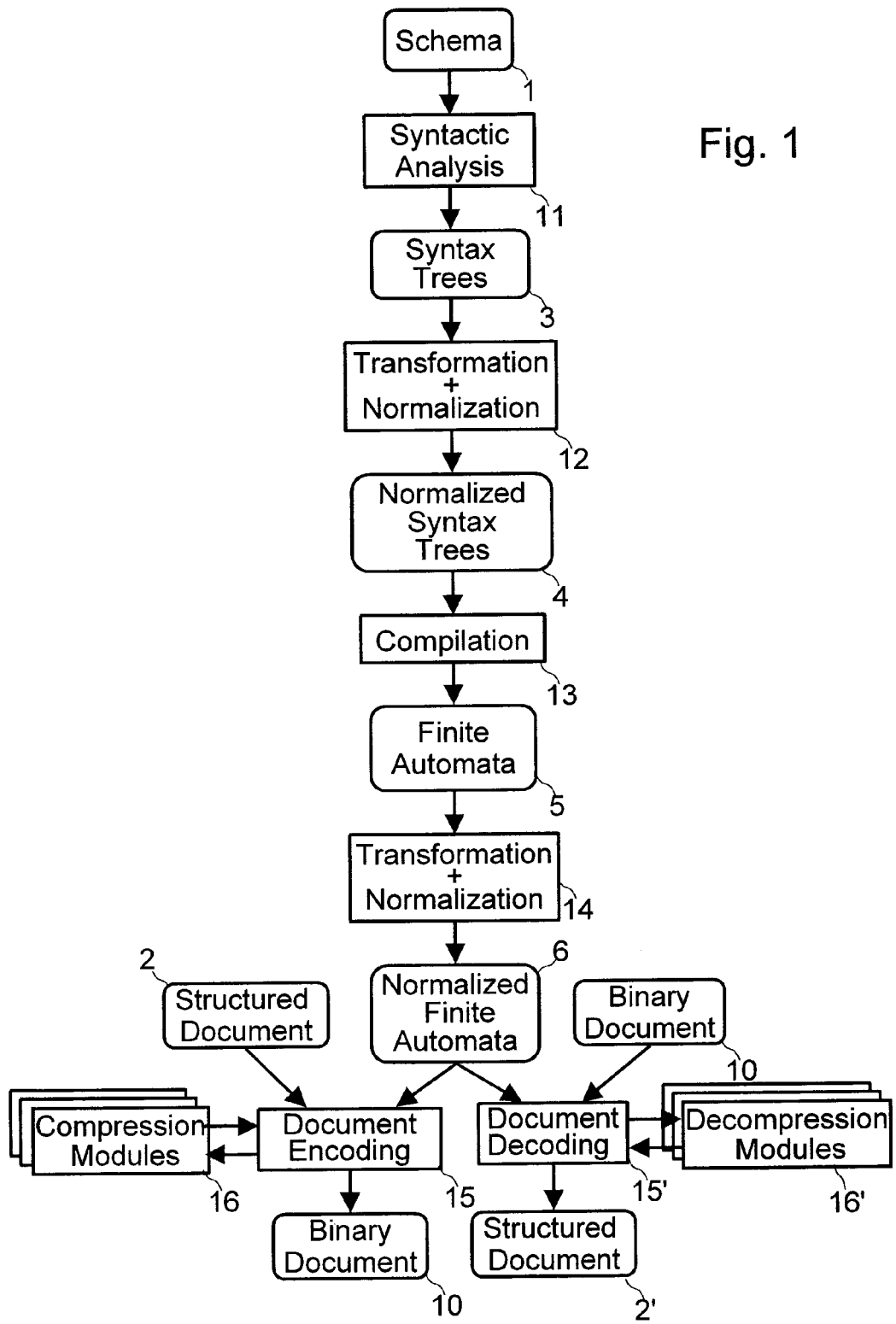
FIG. 1 represents in the form of a block diagram the links between the different steps of the method according to the invention.

This method is designed to process a structured document constituted by a structure schema 1 defining the document's structure and by the document's structured data.

In the XML Schema language, a structure schema has for example the following form:

```
<element name="C">
    <complexType>
```

```
        <attribute name="a2" required=false type="boolean"/>
        <attribute name="a1" required=true type="integer"/>
        <Group order=choice>
            <element name="A" type="TA"
            minOccurs=1 maxOccurs=1/>
            <element name="B" type="TB"
            minOccurs=1 maxOccurs=1/>
        </Group>
    </complexType>
</element>
```

This schema shows that the element named "C" has a complex structure constituted by a first element named "a2" of the Boolean type which is optional, a second element named "a1" of the integer type which is always present in the structure, and a group of alternative elements named "A" and "B" of respective types "TA" and "TB", one of these two elements being present on a single occasion in the structure.

Types "TA" and "TB" are defined in the document's structure schema by a similar formulation.

Generally speaking, the following element groups are used to define a document's structure:

SEQ: which defines a list of sequenced elements which must all appear in the document and in the sequence indicated, CHO: which defines a set of alternative elements, a single element of the group having to appear, ET: which defines a set of elements which must all appear in the document in some sequence or other which is not be modified, $ET_{NO}$: which defines a set of elements which must all be present in the document in some sequence or other which is of no importance, and ANY: which includes some element or other among all the possible elements which can be found in the document.

According to the invention, this formulation is analyzed and transformed at step 11 of the method so as to obtain syntax trees 4, on the basis of one tree per structure element. The syntax tree corresponding to the structure element TC is symbolized by the following formula:

$$TC \to \left( (a1_{\{int\}}^{1\ldots 1} \&_{no} a2_{\{bool\}}^{0\ldots 1})^{1\ldots 1}, (A_{\{TA\}}^{1\ldots 1} | B_{\{TB\}}^{1\ldots 1})^{1\ldots 1} \right)^{1\ldots 1} \quad (1)$$

wherein:

"→" shows that TC is the name given to the structure defined after this symbol,

"( )" shows the priorities with which the groups of elements are to be read,

"," corresponds to a group of elements of the sequence type (SEQ),

"|" represents a group of alternative elements (CHO)

"&" represents a group of ET type elements

"$\&_{NO}$" represents a group of non-sequenced ET type elements

"{ }" associates with an element a structure element name or a base type (for example integer or Boolean), and "$A^{x\ldots y}$" shows that the element A is repeated by x to y times in the document, y being able to be equal to "*" representing an indeterminate value.

This formulation also uses the symbol "$" which represents any element (ANY).

The formula (1) may be represented by the tree shown in FIG. 2c, this tree including a root element "TC" 43 constituted by a single occurrence of a sequence type group 44. This group includes a single occurrence of a non-sequenced "ET" type group 45 and a single occurrence of an alternative group 46.

The group 45 being constituted by a single occurrence of an integer named "a1" and of a Boolean named "a2", and the group 46 including a single occurrence of an element named "A" of the "TA" type and an element "B" of the "TB" type.

Types "TA" and "TB" obtained in step 11 are for example given by the following formulae:

$$TA \rightarrow \left( (a3_{\{int\}}^{1 \ldots 1} \&_{no} a4_{\{int\}}^{0 \ldots 1})^{1 \ldots 1}, (X_{\{TC\}}^{1 \ldots 1}, Y_{\{TC\}}^{1 \ldots 1})^{1 \ldots 1} \right)^{1 \ldots 1} \quad (2)$$

$$TC \rightarrow \left( (a1_{\{int\}}^{1 \ldots 1}, a5_{\{bool\}}^{0 \ldots 1})^{1 \ldots 1} \right) \quad (3)$$

and represented by the trees shown in FIGS. 2a and 2b respectively.

The type "TA" 31 includes a single sequence type group 32 constituted by two single groups 33, 34, of the ET and SEQ type respectively. The group 33 includes two single occurrences of the integer type, named "a3" and "a4" respectively. The group 34 includes two single occurrences of the type "TC", named "X" and "Y" respectively.

The type "TB" 39 is constituted by a single sequence type group 40, which includes two Booleans named "a1" and "a5" respectively.

Although in the preceding description the name of each element and its type are distinguished, the method according to the invention applies also to structuring languages which make no such distinction.

Furthermore, the structure elements must be determinist in other words an element must not be able to be interpreted in several different ways. For example, in the schema "(a|(a, b))", where "a" appears, it is not known whether "b" must appear after it. To this end, there are algorithms which can be applied by the method according to the invention so as to convert a non-determinist schema into a determinist schema. Reference may be made for example to the documents ["Regular expressions into finite automata" Brüggemann-Klein, Anne, Extended Abstract in I. Simon, Hrsg, LATIN 1992, S. 97-98. Springer-Verlag, Berlin 1992. Full Version in Theoretical Computer Science 120: 197-213, 1993]. Thus the schema given heretofore may for example be replaced by "(a, $b^{0 \ldots 1}$)".

In the next step 12 of the method according to the invention, the elements of the structure schema converted into syntax trees may first of all be subjected to a process of reduction or simplification.

This reduction process consists in carrying out a general leveling by generating a single syntax tree 51 from all the trees 31, 39, and 43, as is shown in FIG. 3.

This tree in fact represents a dictionary of all the element types likely to be encountered in the document, these elements being collected together in an alternative type group 52 appearing at least once (1 . . . *) in the document. In this tree, the complex type elements "A", "B", "X" and "Y" are associated with an "ANY" type, and the element "a1" which appeared twice (in the elements "TB" and "TC") with different types, is associated with a default "pcdata" type according to the XML language or with the element type in the initial document, for example "text". The same data set may indeed be represented in several ways: for example a binary sequence may also be considered as can a character string or an integer number.

Alternatively, this reduction process consists in leveling the syntax trees locally to obtain the trees shown as 31', 39' and 43' in FIGS. 4a to 4c.

In each of these figures, the groups 32 to 34 (FIG. 2a), 40 (FIG. 2b) and 44 to 46 (FIG. 2c) have been replaced by an alternative type group 53, 54, 55, respectively, which appear at least once (1 . . . *).

The trees "TA", "TB" and "TC" can be further subjected to an additional process to remove the ambiguities appearing in the structure schema.

At step 12, the trees "TA", "TB" and "TC" are also subjected to a normalization process consisting in re-sequencing the schema in such a way as to obtain a single sequence of the elements of the schema. This process assigns a binary number to the different nodes of the syntax trees obtained from the previous processes. This number is used when the relevant element is compressed.

This normalization process consists in assigning to each group a signature constituted by the concatenation of the group's name with the signature of all the elements and sub-groups of the group, previously sequenced. Thus, the group 53 in FIG. 4 is associated with the signature "CHO.a3.a4.X.Y" (or "|a3.a4.X.Y").

For this normalization process, it is considered that the sequenced groups (SEQ) are already normalized. The groups to be normalized are therefore groups of the alternative type ("CHO"), and the "ET" and "$ET_{NO}$" groups. This process includes the following steps for each group G composed of sub-groups $g_i$ and elements $e_i$:

normalizing any sub-groups $g_i$ of the group G before normalizing the group G, the normalization algorithm being recursive, arranging any elements $e_i$ of the group G before the sub-groups $g_i$, arranging the elements $e_i$ in a pre-defined order, arranging the sub-groups $g_i$ in the pre-defined order, and determining the signature of the group G obtained by the concatenation of all the signatures of its components (elements and sub-groups) according to the order established as a result of the previous steps.

The pre-defined order for arranging the components of the group may be the alphanumerical order of their respective signatures, or the descending order of their minimum number of occurrences, and the components having the same minimum number of occurrences being then arranged in alphanumerical order.

It should be noted that this normalization process is not necessary in the method according to the invention. The order in which the components appear in the schema may indeed be retained.

The next step 13 in the method consists in generating finite automata 5. This process consists in generating for each syntax tree a set of base automata, on the basis of one automaton per group of the syntax tree, then in combining these base automata.

In FIG. 5a, the automaton of a sequential group (SEQ) of n elements of signatures m1, m2 to mn, of an immediately lower hierarchical level includes n+2 states numbered from 0 to n+1 symbolized in the figure by circles, each node being connected to its successor by a transition symbolized by an arc corresponding to a group element and called by the element signature, the last transition F (towards the state n+1) marking the end of the group.

In FIG. 5b, the automaton of an alternative type group (CHO) of n elements of signatures m1, m2 to mn, of an immediately lower hierarchical level includes an initial state numbered "0" and n final states numbered from 1 to n, the state 0 being connected to the final state 1 to n respectively by n transitions corresponding to the n group elements respectively.

In FIG. 5c, the automaton of an ET group of n elements of signatures m1, m2 to mn, of an immediately lower hierarchical level includes 1+n+n*(n−1)+n*(n−1)*(n−2)+ . . . +n! states representing all the possible combinations of the n elements.

An automaton of this kind may be generated by a simple algorithm such as the one which follows:

```
E is the set of all the possible components of the
    group
Execute Function_1 (E, initial state)
Function_1 (E, state e):
    Repeat while E is not empty
        Select an element mi from E and withdraw it from E
        Create a state e' and an arc joining e to e'
            denoted mi
        Duplicate E as E'
        Execute function_1 (E', state e')
    End repeat.
```

The automaton of a group $ET_{NO}$ of n elements of signatures m1, m2 to mn, of an immediately lower hierarchical level may be that of an SEQ so long as it is acceptable to lose the information relating to the order of appearance of the elements in the group or it is fixed.

These automata (the case of groups of the type CHO, ET and $ET_{NO}$) can be optimized by applying an avoidance process of the optional elements, i.e. those with a total number of possible currencies in the form (0 . . . k).

This rule reflects the fact that each element associated with a minimum zero number of occurrences is not necessarily encoded.

As shown in FIG. 6, this process consists in adding a transition between the state "1" located immediately upstream of an optional element "2" and all the states "3" located immediately downstream of this element, this new transition being associated with the signature "m3" of the element corresponding to the state where it ends.

If one of the states located immediately downstream is also associated with an optional element, a transition must also be provided to all the states located immediately upstream of this state.

This process may be carried out using the following algorithm:

```
Let Z be the sub-set of the nodes of the automaton
    for which the associated element has a minimum zero
    occurrence.
Repeat (while the automaton is modified by the
following procedure):
    For each element X of Z:
        For each incoming transition TEx of X:
            For each outgoing transition TSx of X:
                1.Create a new transition N connecting the
                    source node of the transition TEx and the
                    destination node of the transition TSx. The
                    transition is marked by the value of the arc
                    TSx.
                2.If an identical transition does not already
                    exist in the graph, add it to the graph
                End for
        End for
    End for
End repeat
```

It should be noted that the automata thus generated for one structure schema are nested in each other. Indeed, in the automaton corresponding to the schema example shown in FIG. 2, when the type TC (elements X and Y) is encountered in the automaton corresponding to the type TA 31, the automaton corresponding to the type TC 43 is fully executed before proceeding with the execution of the automaton corresponding to the type TA.

The next step 14 of the method according to the invention consists in reducing and converting the automata previously obtained.

It is thus possible to merge the automata of the same syntax tree (and not automata of different trees which invoke each other) in the manner explained with reference to FIGS. 7a and 7b.

These figures show the automata which have been generated in accordance with the method according to the invention from the structure element $(a_1^{0 \cdots *}, (b_1|b_2)^{0 \cdots *})$. The first automaton (FIG. 7a) corresponds to the group SEQ (","), whereas the second automaton (FIG. 5b) corresponds to the alternative group ("|").

When executing these automata, reaching state 2 in the first automaton activates the execution of the second automaton and reaching the final state 1 or 2 in the second automaton is followed by the pursuit of the execution of the first automaton, in other words the execution of the transition F between the state 2 and the final state 3 of the first automaton.

The process of merging the two automata makes it possible to obtain the automaton shown in FIG. 8, wherein each alternative of the CHO group is shown by a transition associated with the signature "cho.b1.b2" of the group, concatenated with the signature "b1", "b2" of the group element appearing in the selected alternative.

During this step 14, the automata may also be subjected to a process for minimizing the number of states, for example by applying Hopcroft's algorithm, then a normalization process to obtain normalized automata 6.

Following this process, the transitions from each node are numbered from 0 to n.

The next step 15 consists in re-reading the document 2, in compressing the data which it contains by executing the automata on the structure of the document, in order to obtain a succession of binary sequences in which the compressed value of each element or base data set of the document is found. According to a first type of encoding, these binary sequences are in the form $(K.N.V_1 \ldots V_N)_e$ for each element or group of elements e, N being the number of occurrences of the element e or the number of successive data sets corresponding to the element e, K being the number of the transition having made it possible to reach the element e, and $V_1 \ldots V_N$ the respective, possibly compressed, values of the N occurrences of the element e. If e is a group of elements, its value V is broken down into as many binary sequences (K.N.V) as it contains elements. However, in certain cases, N may be omitted, particularly when this number is fixed. The same is true for K in the event of there being only a single arc coming from a state, for example in a group of the sequence type.

A general heading of the compressed document may first be made which groups together several encoded parameters, useful for the description of the document. Such a heading may thus include a signature of the structure schema or schemas used, and a set of parameters describing the coding used, as for example:

a parameter indicating whether the coding of the length of each element is mandatory or optional or not present in the document, a parameter indicating whether the elements may or may not be sub-typed, i.e. associated with a more precise type that their base type, and a parameter indicating the type of coding used for the number of occurrences.

Each information element of the document may also be associated with a heading, its presence and its nature being indicated in the document heading.

The heading of an element may thus include its encoded length, in such a way as to allow, when the document is decompressed, access to a particular element without decompressing all the previous elements in the document. The element headings are inserted in the document for example just prior to encoding the value of the elements.

In a general way, compressing the document consists in reading the document sequentially, in executing the automata of the schema, which makes it possible additionally to check that the document's structure corresponds to the schema compiled.

During this process, the number of occurrences of each element appearing in the document is encoded. To this end, the following rules are applied.

Where the number of occurrences of an element e is defined by (i . . . j), the following cases may be distinguished:

If j is different from "*" and i is different from 0, the coding is broken down into two parts, namely (i.,i) and (0 . . . j−i), the first part is not encoded since this formulation specifies that i occurrences are necessary. The second part is encoded on $|\log_2(j-i+1)|$ bits.

If j is different from "*" and i is equal to 0, the number of occurrences is encoded between 1 and j, in other words on $|\log_2(j)|$ bits, since if this coding is necessary, it means that there is at least one element e in the document.

If j is equal to "*", a coding technique such as ASN1 is used, according to which the first byte indicates the number of coding bytes, and the following bytes contain the value of the number of occurrences. It is also possible to use the high-order bit of each byte to indicate whether or not it is the last coding byte of the number of occurrences, the next seven bits of each byte being used to encode the number of occurrences.

Alternatively, another coding type may be selected wherein it is not necessary to introduce the number of occurrences of the elements of a structure schema. According to this coding type, a type called "escape" or "esc" is introduced which indicates the final state of the automata. It is therefore necessary to first apply a conversion to the automata obtained previously.

This conversion consists in adding to each state of the automata a return transition to the previous state and in adding an "esc" transition to a final state, marking the end of the execution of the automaton. The coding of the elements is then no more than the form (KV), the coding of an automaton terminating in the number $K_{esc}$ of the transition "esc".

In fact, this coding type is only advantageous for encoding complex forms and for elements which do not have a maximum number of occurrences. It is in particular quite adapted to encoding alternative type groups including a number of elements different from $2^p$, where p is an integer number.

This coding type may be combined with the previous type. This has only to be indicated in the heading of the compressed document and a bit assigned to the locations in the encoding where there are to be a number of occurrences.

According to the invention, at least one base type of the data sets of the document is associated with an external compression module 16. In this way, when reading the document, the respective types of the data sets encountered are analyzed, and when a type of data set is associated with an external compression module 16, this is applied to the content of the data set and the result of the compression inserted into the compressed document as a value of the corresponding data set.

External compression modules may for example apply the "mp3" standard for sound information, "jpeg" for images and "MPEG1" or "MPEG2" for video type data.

If no compression module is associated with a type of data set, a default compression module may be used or the data sets having this type recovered as they appear in the initial document.

If in the heading of the document it is indicated that encoding the length is optional or mandatory, the elements are associated with a heading in the compressed document containing the length as a number of bits of the value of the element. This particularity allows direct access to an element of the compressed document without having to decompress the elements located before in the document, by reading by means of automata only the respective lengths of these elements as far as the element being sought.

The length of the elements may be encoded in the following way.

Where in the heading of document it is indicated that encoding the length of the elements is mandatory the length L of the elements as a number of bits is calculated using the following formula:

$$L=8*p+h$$

where p represents the number of bytes (in ASN1 coding or using the high-order bits of each byte used to encode this number) used to encode the element length, and h represents the number of remaining bits of this length (h<8).

It should be noted that the external compression module 16 which is called on to encode the element value can provide this length in return.

Where encoding the length of the elements is not mandatory, the value of the first bit corresponding to the element value indicates whether the following bits represents or do not represent the element length.

If the elements can be sub-typed (indicated in the document's heading), any new types are inserted into an element heading placed in the compressed document just prior to the element value. The first bit indicates whether the element type is different or not from the expected type. In the first case, the next bits in the element heading contain the code of the new type, this code being determined by numbering all the possible sub-types of the element base type, this numbering being given by encoding the document's structure.

More precisely, a document is encoded in three main steps.

In the first step, the arcs leaving each node are numbered. This step is optional if there is only one arc leaving the node. If there are n arcs leaving, with each of these arcs is associated a number given in the order of the arcs assigned at normalization (step 14). This number is encoded over n' bits, n' being such that $2^{n'-1}<n\leq 2^{n'}$.

Thus, if n transitions are issued from the state E, each transition will be encoded over $|\log_2(n-1)|+1$ bits.

In the second step, the number of occurrences of each sub-automaton is encoded as described above.

In the third step, the sub-automaton is encoded. This process may be expressed by the following algorithm:

Get into position at the start of the automaton, While the active state is not final
The arc being crossed is encoded, if necessary
The number n of occurrences is encoded, if necessary
Move around in the sub-automaton corresponding to the node reached, This sub-automaton is encoded n times.
Go back to the initial automaton.
End While.

For example, to encode the occurrence "$a_2\ a_3\ a_1\ a_1\ a_3$" of the automaton $(a_1|a_2|a_3)^{(0\cdots *)}$, there are three outgoing arcs. The arcs are therefore numbered on two bits. Consequently, the result of the coding is as follows in the case where the number of occurrences is encoded:

| 0000 0101 | 01 | $V_{a2}$ | 10 | $V_{a3}$ | 00 | $V_{a1}$ | 00 | $V_{a1}$ | 10 | $V_{a3}$ |
|---|---|---|---|---|---|---|---|---|---|---| where "0000 0101" represents the binary value of the number of occurrences i.e. 5, and $V_{a1}$, $V_{a2}$, and $V_{a3}$ are the values of the occurrences of a1, a2 and a3 respectively.

Where the number of occurrences is not encoded:

| 01 | $V_{a2}$ | 10 | $V_{a3}$ | 00 | $V_{a1}$ | 00 | $V_{a1}$ | 10 | $V_{a3}$ | 11 |
|---|---|---|---|---|---|---|---|---|---|---|

11 corresponding to the number of the outgoing transition "esc".

In the example in FIGS. 7a, 7b, encoding the occurrence "$b_2\ b_1\ a_1$" of the automaton $(a_1^{0\cdots *}, b_1|b_2)^{0\cdots *}$ leads to the following result (where the states are not merged):

| 0000 0010 | number of occurrences of the sequence (here twice) |
|---|---|
| 1 | encoding the arc "cho.$b_1$.$b_2$" |
| 0000 0010 | number of occurrences of the group "cho.$b_1$.$b_2$" (here twice). |
| 1 | encoding the arc $b_2$ in the group "cho.$b_1$.$b_2$" |
| $V_{b2}$ | encoding the value $b_2$ |
| 0 | encoding the arc $b_1$ in the group "cho.$b_1$.$b_2$" |
| $V_{b1}$ | encoding the value $b_1$ |
| 0 | encoding the arc $a_1$ |
| 0000 0001 | number of occurrences of $a_1$ |
| $V_{a1}$ | encoding the value of $a_1$ |
| 1 | encoding the outgoing arc F |

Where the states are merged (FIG. 8)

| 0000 0010 | Number of occurrences of the sequence |
|---|---|
| 10 | Encoding the arc "cho.$b_1$.$b_2$-$b_2$" |
| 0000 0010 | Number of occurrences of the group "cho.$b_1$.$b_2$". |
| $V_{b2}$ | Encoding the value $b_2$ |
| 0 | Encoding the arc $b_1$ in the group "cho.$b_1$.$b_2$" |
| $V_{b1}$ | Encoding the value $b_1$ |
| 00 | Encoding the arc $a_1$ |
| 0000 0001 | Number of occurrences of $a_1$ |
| $V_{a1}$ | Encoding the value of $a_1$ |
| 10 | Encoding the outgoing arc F |

It may be necessary to re-arrange the automaton, particularly if the schema has been interpreted and re-ordered in such a way as to optimize coding in the case of the group $ET_{NO}$.

If the attribute sequence is not useful (as in the XML language), it is possible to encode so as to re-order the element attributes in a pre-determined sequence, for example in an alphanumerical sequence, then according to whether they are required or not. This arrangement makes it possible to reduce the size of the compressed description accordingly.

The process of decompressing a document thus obtained is performed by executing steps 11 to 15 on the document's structure schema to obtain the automata, then by executing step 15' of decoding and decompressing the document, this step consisting in running through the compressed document executing the automata obtained as a result of steps 11 to 14, in such a way as to be able to determine the type and the name of the compressed information elements encountered in the document. The values of the elements which have been obtained by means of external compression modules 16 are decompressed by means of corresponding decompression modules 16'.

It should be noted that if several documents having the same structure schema are to be processed (compressed or decompressed), steps 11 to 15 are only executed once, only steps 15 and 16 (or 15' and 16') having to be applied to each document to be processed.

The invention claimed is:

1. A method for decoding a binary document for recovering a structured document of the XML type;
   a. said structure document
      i. being associated with at least one tree structure schema defining a structure of the structured document and
      ii. including nested structure elements delimiting data sets of the structured document,
   b. said binary document being coded using the tree structure schema to represent this document in a compact way,
   c. the decoding comprising the step of modeling a decoding process which uses a knowledge of said tree structure schema, and the step of triggering the decoding using the tree structure schema by decoding a first data set of one type in said structured document with a decompression algorithm and decoding a second data set of another type in the said structured document with another decompression algorithm for recovering the structured document,
   distributing the structured elements into three categories, including structured root elements, groups of elements, and structured, or unstructured base elements corresponding to lowest level elements, and associating each base element with an information type, at least one information type of the base elements being associated with an adapted decoding algorithm, and
   comprising the step of executing the decoding algorithm when a coded data set having an information type associated with said algorithm is encountered in the coded document.

2. The method according to claim 1, further comprising a step of receiving the structure schema with the coded document.

3. The method according to claim 1, further comprising tagging each coded data set in the coded document, to enable direct access to a particular coded data set, without decoding data sets preceding said particular data set in said coded document.

4. The method according to claim 1, further comprising a step of optimizing said structure schema, said step comprising reducing a number of hierarchical levels of grips of structure elements.

5. The method according to claim 1, further comprising associating each structure element in said structure schema with a set of possible numbers of occurrences, indicating the number of times that a coded data set of said coded document having said structure element can appear in a coded data set of immediately higher level.

6. The method according to claim 1, further comprising providing the coded document, for each data set of said original structured document, with a transition number referring to the structure element defining the structure of said data set, and a coded binary value of the data set.

7. The method according to claim 1, further comprising associating each structured element of at least a part of the structure elements of the structure schema, in the coded document, with a number of occurrences of data sets having a structure defined by said structure element, in a data set of immediately higher level.

8. The method according to claim 1, further comprising tagging the end of a group of several occurrences of coded data sets of a same type in the coded document by a binary sequence representing a transition to a final state.

9. The method according to claim 1, further comprising a step of normalizing said structure schema to obtain a single sequence order of the structure elements of the structure schema.

10. The method according to claim 1, comprising the step of performing a syntactic analysis of the structure schema.

11. The method according to claim 1, wherein modeling a decoding process comprises compiling the structure schema to generate at least one finite state automaton, each automaton including states interconnected by transitions respectively representing the structure elements, and during decoding, executing the finite state automata on coded data sets of the coded binary document.

12. The method according to claim 1, wherein, the coding comprises a compressing step, and the decoding comprises a decompressing step.

* * * * *